United States Patent [19]

Nannichi

[11] Patent Number: 5,016,118
[45] Date of Patent: May 14, 1991

[54] IMAGE DETERMINING METHOD AND APPARATUS

[75] Inventor: Toshihiko Nannichi, Fuchu, Japan

[73] Assignee: Kabushiki Kaisha Toshiba, Kawasaki, Japan

[21] Appl. No.: 409,212

[22] Filed: Sep. 19, 1989

[30] Foreign Application Priority Data

Sep. 22, 1988 [JP] Japan .................................. 63-237846

[51] Int. Cl.$^5$ ............................................. H04M 1/40
[52] U.S. Cl. .................................... 358/462; 358/456
[58] Field of Search ............... 358/456, 458, 464, 462; 382/9, 54

[56] References Cited

U.S. PATENT DOCUMENTS 4,403,257  9/1983  Hsieh ................................... 358/462
4,447,830  5/1984  Stoffel ................................. 353/462
4,587,633  5/1986  Wang et al. ......................... 350/462

Primary Examiner—Edward L. Coles, Sr.
Attorney, Agent, or Firm—Finnegan, Henderson, Farabow, Garrett, and Dunner

[57] ABSTRACT

An image determining apparatus for determining a dot matrix image or a character/line picture on the basis of a halftone image signal obtained by scanning an original image including a dot matrix image or a character/line picture. In order to perform such image determination, first, a pixel block corresponding to a two-dimensional region of a predetermined area is extracted from the half-tone image signal, the average pixel density of the extracted pixel block is calculated, and the respective pixels of the pixel block are binarized using the calculated average pixel density as a density threshold. The binarized pixel block is accessed sequentially in the main scan and subscan directions to check the length and frequency of occurrance of runs of a particular color pixel. If the length and frequency of occurrence of these runs are in a predetermined relationship, it is determined that the pixel block concerned is a dot matrix image or a character/line picture.

14 Claims, 7 Drawing Sheets

FIG. 3 (a)

ORDER OF ACCESS IN MAIN SCAN DIRECTION

| 1 | 2 | 3 | 4 |
|---|---|---|---|
| 5 | 6 | 7 | 8 |
| 9 | 10 | 11 | 12 |
| 13 | 14 | 15 | 16 |

FIG. 3 (b)

ORDER OF ACCESS IN SUBSCAN DIRECTION

| 1 | 5 | 9 | 13 |
|---|---|---|---|
| 2 | 6 | 10 | 14 |
| 3 | 7 | 11 | 15 |
| 4 | 8 | 12 | 16 |

IMAGE DETERMINING METHOD AND APPARATUS

BACKGROUND OF THE INVENTION

1. Field of the Invention

The present invention relates to image determining methods and apparatus which determine the type of the original image on the basis of the image signal read by a facsimile device or the like, and more particularly to methods and apparatus which discriminate clearly between a character/line picture and a dot matrix photograph image and performs efficient image processing, whether both the images are present mixed in an image.

2. Description of the Prior Art

Many halftone images and color images present around us are often prints using a dot matrix photograph, which is used to express the density of an original document in the field of printing and causes human eyes to feel the density of a print depending on the size of ink dots or the number of ink dots per unit area. The period of ink dots varies from a very short one to a very long one.

Generally, a halftone image or a color image contains a regular continuous density photograph image while in a general image processing technique, it is determined whether the image is a dot matrix photograph or a continuous density photograph depending on whether an edge as the pixel is detected. Such image determination is realized relatively easily.

If a dot matrix photograph image is scanned for reading through an image reader such as a facsimile device and the original image is tried to be reproduced by using dither processing, a low frequency beat or moire pattern will appear in the reproduced image to thereby render the image very unclear by interference of a particular frequency of the dot matrix of the read original image and the repetition frequency component of the dither matrix since the dot matrix image itself includes a dot image having periodicity.

Usually, in order to cope with the appearance of such moire pattern, a method is employed in which a change in the gradation of the dot matrix image is converted to a characteristic similar to that of a regular continuous density photograph image, and the resulting signal is subjected to dither processing to reproduce an image. According to such processing, frequency interference would not occur nor would a moire pattern appear in the reproduced image. Such image processing itself can be performed also in the regular continuous density photograph image.

Other images discriminated from a continuous density photograph image in accordance with the detection of the image edge are so-called characters/line pictures including characters/patterns. These character/line pictures are different from the dot matrix images. When the characters/line pictures are reproduced as images, their edges must be emphasized appropriately and binarized as a signal indicative of one of white and black pixels. Thus, the character/line pictures are required to be subjected to image processing different by themselves from the dot matrix image.

Prints handled usually by facsimile devices can include only character/line pictures or only dot-matrix images, but generally, include mixed character/line pictures and dot matrix images in many cases. When an image which includes mixed character/line pictures and dot matrix images is reproduced, undesinably, the filtering preferable for the dot matrix image would deteriorate the image quality of the character/line picture whereas edge emphasis preferable for the character/line pictures would deteriorate the image quality of the dot matrix image.

Thus, in order to reproduce an image of mixed character/line pictures and dot matrix images with high quality, it is desirable that these character/line pictures and dot matrix images are discriminated beforehand from each other and image processing appropriate for the respective image types should be performed in accordance with the discriminations, but there are no conventional methods and apparatus for preferable for such image discrimination.

There is a method of discriminating a dot matrix image area from an image signal using high frequency components of the image signal extracted by Fourier transform, but this method has a difficulty in practicality for the following reasons:

(a) Processing is complicated;
(b) A memory of enormous capacity is required; and
(c) An area to be referred to is large.

SUMMARY OF THE INVENTION

It is therefore an object of the present invention to provide an image discriminating method and apparatus which is capable of easily discriminating between a dot matrix image area and a character/line picture area in an image signal with high accuracy, and capable of reproducing an image of high quality on the basis of subsequent respective image processings even if the image includes mixed dot matrix image area and character/line picture area.

In order to achieve such object, according to the present invention, first, a pixel block corresponding to a two-dimensional region of a predetermined area is extracted from a halftone image signal, the average pixel density in the extracted pixel block is calculated, the respective pixels in the pixel block are binarized using the calculated average pixel density as a density threshold, the binarized pixel block is accessed sequentially in the main scan direction and the sub-scan direction to examine the length of and frequency of occurrence of the run of a particular color pixel, and it is determined whether the pixel block includes a dot matrix image or a character/line picture depending on whether the length and frequency of occurrence of the run are in a predetermined relationship.

Generally, the gradation changes more rapidly in the dot matrix image area than in the character/line picture area. The relationship between the run length and the frequency of occurrence of runs of dark or white pixels in each pixel block when accessed in the main scan direction and those accessed in the sub-scan direction differs by itself from the relationship between those in the character/line picture region. Therefore, if a predetermined determination logic is empirically determined beforehand for the relationship between the length and frequency of occurrence of these runs, it is determinable easily and appropriately on a real-time basis whether each extracted pixel block is a dot matrix image or a character/line picture.

The pixels of each binarized pixel block are not necessarily accessed in the main scan and sub-scan directions. Of cource, image determination is possible on the basis of the predetermined logic of the determination directly from a logical form using as a reference the length and frequency of occurrence of runs of any color pixel in each pixel block.

BRIEF DESCRIPTION OF THE DRAWINGS

FIGS. 3 A & B schematically illustrate the order in which pixel blocks are accessed by the image determining apparatus.

DESCRIPTION OF THE PREFERRED EMBODIMENT

Figure 1:
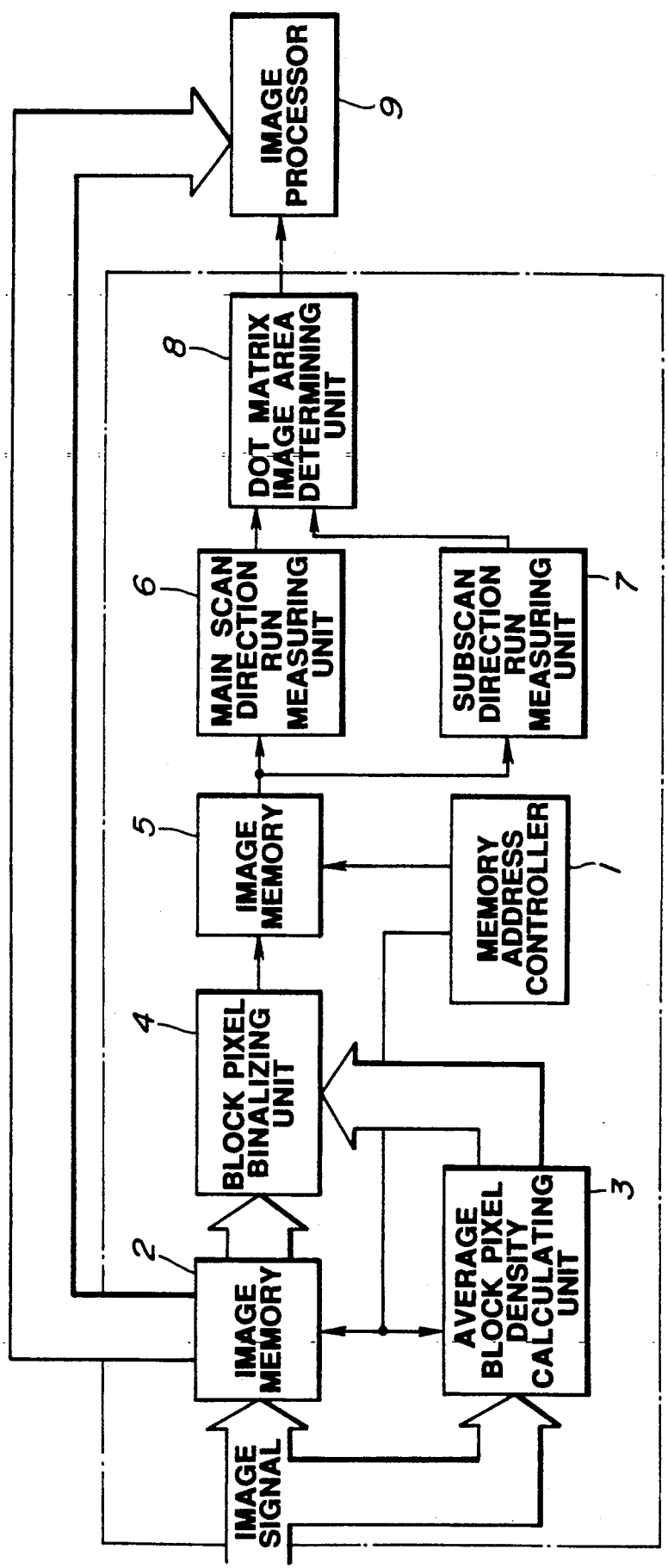
FIG. 1 is a block diagram of one embodiment of an image determining apparatus according to the present invention.

FIG. 1 illustrates one embodiment of an image determining apparatus according to the present invention. When a dot matrix image and a character/line picture are discriminated in accordance with an image signal indicative of an original image which is assumed to contain a dot matrix image and a character/line picture, a pixel block which includes 4×4 pixels as one block corresponding to a predetermined two-dimensional area is extracted from the image signal, the pixel contents of each extracted pixel block are retrieved to determine whether the pixel block is a dot matrix image area or a character/line picture area.

Such extraction of a pixel block may be performed via an appropriate image memory. For example, when the image signals are sequentially written into the memory, a write address may be designated using an address signal of 8 or 16 bits. In this case, the address signal changes its third bit value (logical contents) each time four pixels are written. Therefore, if the third bit value in the address signal is perceived, the appropriate pixel block of 4×4 pixels can be recognized and hence the pixel block using its third bit address as the block separating or recognizing address can be extracted.

The image determining apparatus of the particular embodiment is constituted on such presumption. The structure and functions of the respective elements of the apparatus will now be described with reference to the block diagram of FIG. 1. As shown in FIG. 1, the image determining apparatus includes a memory address controller 1 which recognizes a pixel block while realizing predetermined synchronous memory addressing for each block, a first image memory 2 which receives an image signal of indicative of the original image which may include a dot matrix image or a character/line picture read through an image reader (not shown) such as a facsimile device and which temporarily stores the received image signal in units of a pixel block of 4×4 pixels in accordance with an address signal from the memory address controller 1, an average block density calculating unit 3 which receives the image signal indicative of the original image and which calculates the average pixel density of each pixel block of 4×4 pixels in accordance with the address signal from the memory address controller 1, an block pixel binarizing unit 4 which reads a stored image signal from the first image memory 2 in units of a pixel block and which binarizes the read image signal (pixel) using as a threshold the average pixel density of the block calculated by the average block image density calculating unit 3, a second image memory 5 which stores temporarily the data (on a black or white pixel) binarized by the block pixel binarizing unit 4 in accordance with the address signal from the memory address controller 1, a main scan direction run measuring unit 6 and a subscan direction run measuring unit 7 for measuring the run states of a black pixel in the main scan and subscan directions, respectively, on the basis of the binalized data read from the second image memory in accordance with the sequential accesses by the memory address controller 1, and a dot matrix image area determining unit 8 which determines whether the pixel block indicates a dot matrix image area or not from the outputs of the main scan and subscan direction run measuring units 6 and 7 in accordance with a predetermined set logic.

The main scan and subscan direction run measuring units 6 and 7 measure the longest run length and frequency of occurrence of runs of black pixels in the main scan and subscan directions in a pixel block of 4×4 pixels.

The dot matrix image area determining unit 8 checkes whether the longest run length is shorter than a predetermined value and the frequency of occurrence of black runs is higher than a predetermined value, and determines that the pixel block is a dot matrix image area when those conditions are met both in the main scan and subscan directions.

The image processor 9 also shown in FIG. 1 is a well-known circuit which reproduces an image by performing filterning, dither edge emphasizing, and binarizing operations on the image signal indicative of the original image (read from the first image memory 2). Especially, in the particular embodiment, if the output from the dot matrix image area determining unit 8 indicates a dot matrix image area, the image processor 9 reproduces an image by performing filtering and dither processings on the image signal (pixel block) in accordance with the output from the dot matrix image area determining unit 8 while, otherwise, it performs edge emphasizing and binarizing processings on the image signal (pixel block) to reproduce an image.

The image determination by the image determining apparatus will now be described. First, the image signal indicative of the original image read by the image reader is stored in the first image memory 2, as mentioned above.

The average block pixel density calculating unit 3 calculates the average pixel density of each block (of 4×4 pixels) for the image signal and delivers the calculated average pixel density data to the block pixel binarizing unit 4, which maintains a block synchronism in accordance with the addressing by the memory address controller 1 while sequentially binarizing the image signals read out of the first image memory 2 using as a threshold the average pixel density (inherent to each block) received from the average block pixel density calculating unit 3.

Figure 2:
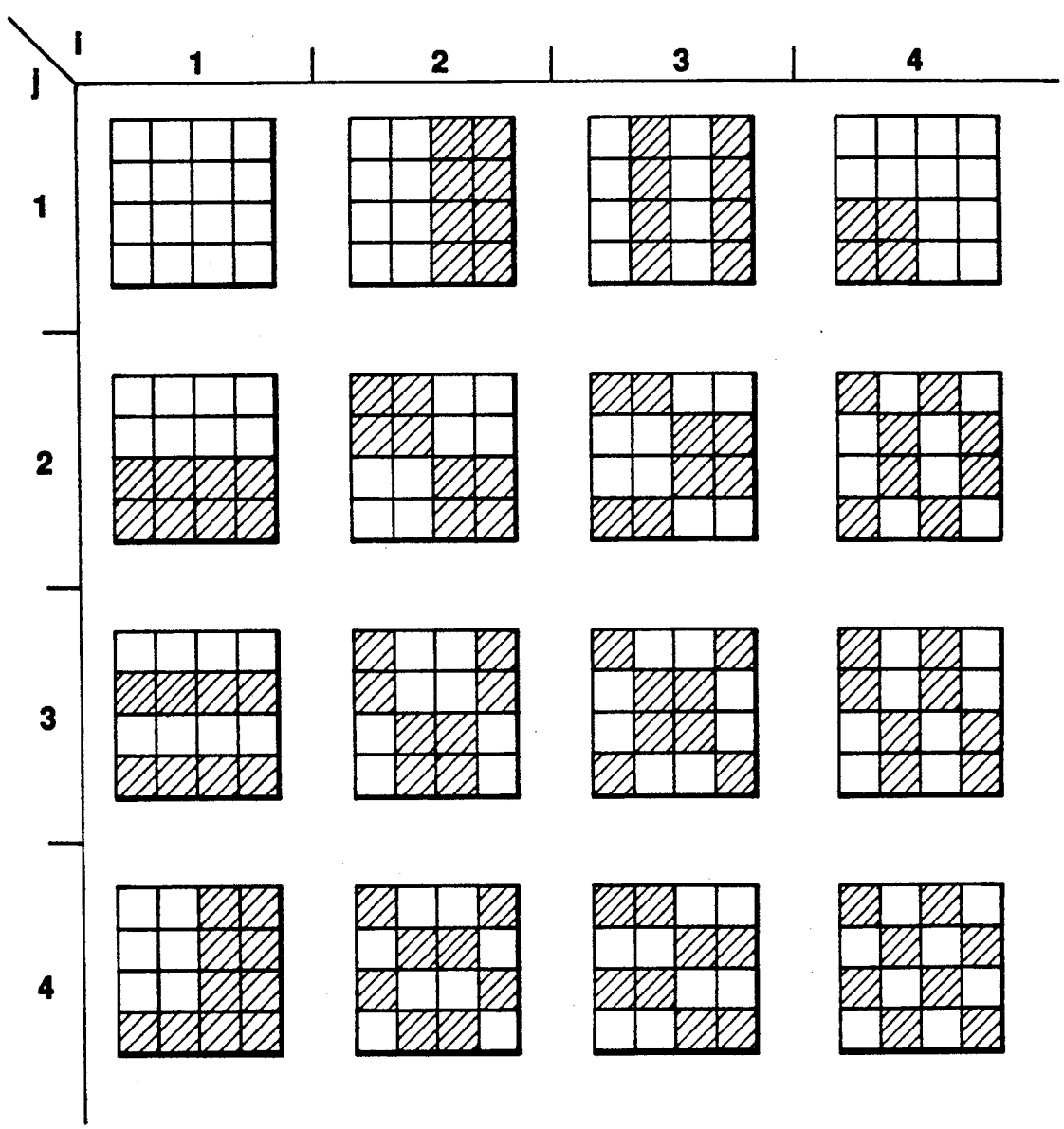
FIG. 2 schematically illustrates the pixel structure of a pixel block binarized by the image determining apparatus.

FIG. 2 shows sample data obtained by the binarization. In FIG. 2, the hatched portions show a pixel (black pixel) of a density higher than the average pixel density and the other portions show a pixel (white pixel) of a density lower than the average pixel density. FIG. 2 schematically shows 16 kinds of pixel blocks as an example. There are other patterns of respective inverses of thicker pixels (black pixels) and thinner pixels (white pixel), not shown. In FIG. 2, for convenience of comprehension, a matrix indication of (i, j) is used as a pixel number. In this connection, in FIG. 2, seven patterns in a (i, 1) row and in a (1, j) column are likely to appear in a character/line picture and the other remaining scaning patterns are likely to appear in a dot matrix image. This is obvious from the nature of each image.

The block syncronization of the data binarized sequentially by the block pixel binarizing unit 4 is maintained by the memory address controller 1 while the data are sequentially being stored in the second image memory 5.

The main scan and subscan direction run measuring unit 6 and 7 measure the state of black pixel run in the main scan and subscan directions, respectively, on the basis of the binary data read from the second image memory 5 in accordance with sequential accessing by the memory addres controller 1. The main scan and subscan direction run measuring units 6 and 7 sequentially access the respective pixel blocks in the orders shown in FIGS. 3(a) and (b) to measure the longest run length and frequency of occurrence of runs of a black pixel of each pixel block concerned in the main scan and subscan directions, respectively.

In this connection, if the run length and distribution of black pixels of the sample shown in FIG. 2 are checked, it will be understood that the number of runs of black pixels and the number of black pixels of short run length are large both in the main scan and subscan directions as the elements of the (i, j) in FIG. 2 are large.

Figure 4:
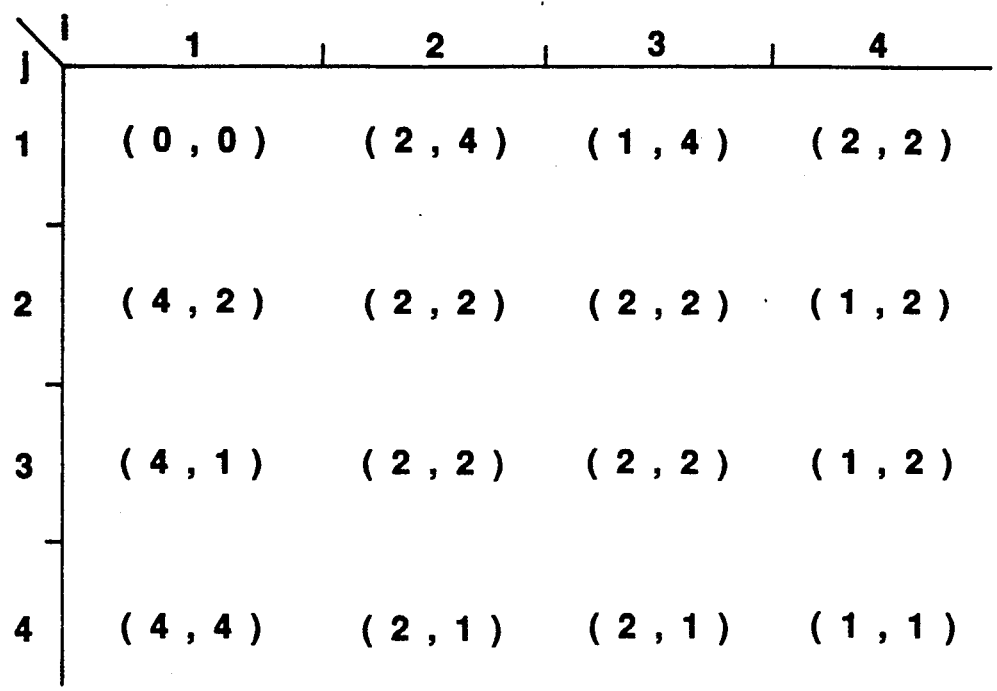
FIGS. 4 and 5 illustrate the results of measuring the longest run length of black pixels of an image block, measured by the image determining apparatus, in the main scan and subscan directions, and the results of measuring the frequency of occurrence of black runs in the main scan and subscan directions, respectively.

FIG. 4 shows the result of measuring the "longest run length of black pixels" in the main scan and subscan directions when the respective pixel block samples shown in FIG. 2 are sequentially accessed in the orders shown in FIGS. 3(a) and (b).

Figure 5:
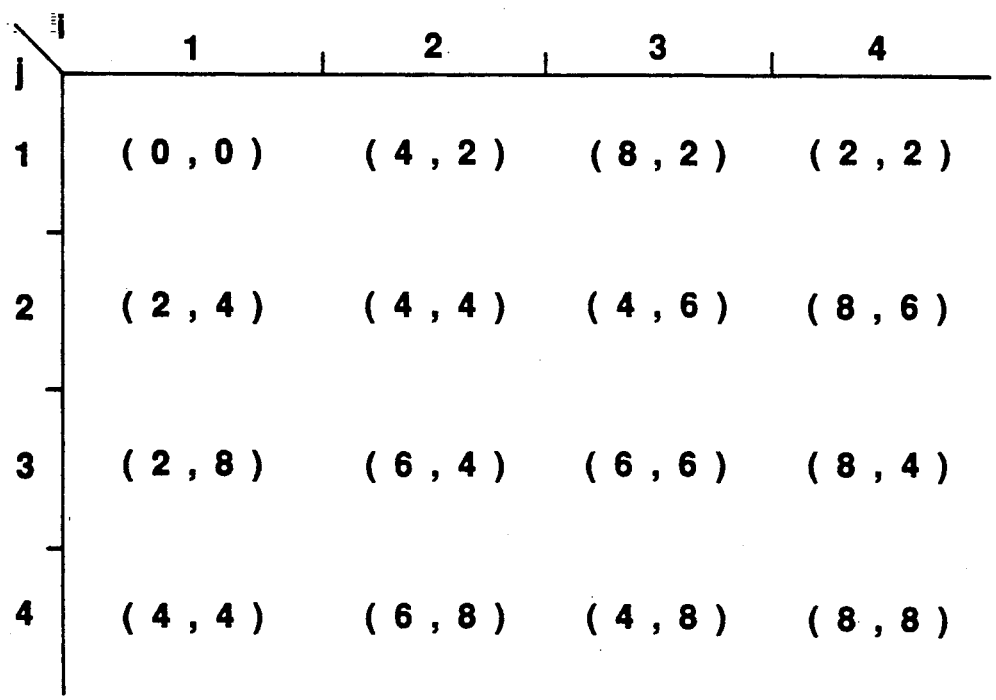

FIG. 5 shows the result of measuring "the frequency of occurrence of black pixels" in the main scan and subscan directions when the respective pixel block samples shown in FIG. 2 are sequentially accessed in the orders shown in FIGS. 3(a) and (b).

In FIGS. 4 and 5, if a pixel block in which "the longest run length of black pixels" is two or less in each of the main scan and subscan directions and in which "the frequency of occurrence of black runs" is three of more is determined to be a dot matrix image area, seven patterns in a (i, 1) row and in a (1, j) column in FIG. 2 are identified as not satisfying these conditions simultaneously. These patterns are nothing but ones which are likely to appear in the character/line pictures.

In this way, the dot matrix image area determining unit 8 determines whether the pixel block concerned is a dot matrix image area from "the longest run length of the black pixel" and "the frequency of occurrence of black runs". Thus, a dot matrix image area is discriminated from other areas (character/line picture area) in a pixel block of any contents easily on a realtime basis. Thereafter, the image processor 9 can perform image processing appropriate for the image type of each of the dot matrix image area and other areas. Of course, this provides a great improvement to the quality of a reproduced image.

While in the above embodiment the dot matrix image area is determined from "the longest run length of black pixels" and "the frequency of occurrence of black runs", it may be determined from the result of measuring "the most frequently occurring run length of black pixels" and "the frequency of occurrence of black pixels" in the main scan and subscan directions.

Figure 6:
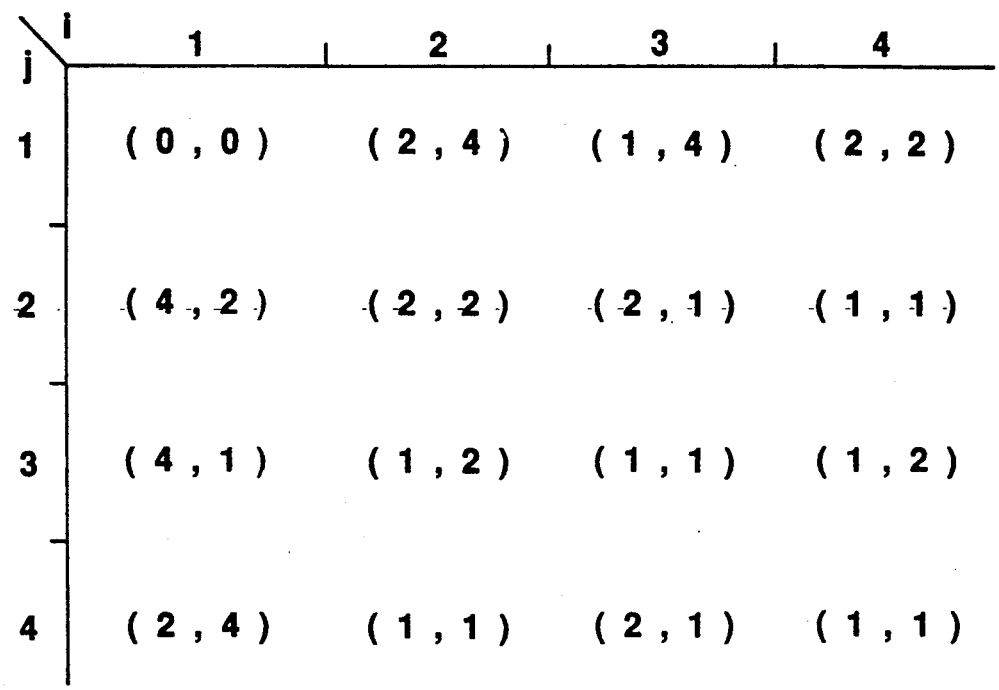
FIGS. 6 and 7 illustrate the results of measuring the most frequently occurring run length of black pixels of an image block, measured by the image determining apparatus, in the main scan and subscan directions, and the result of measuring the frequency of occurrence of the most frequently occurring run length of a black pixel in the main scan and subscan directions, respectively.

FIG. 6 shows the result of measuring "the most frequently occurring run length of black pixels" in the main scan and subscan directions when pixel block samples of FIG. 2 are sequentially accessesd in the orders shown in FIGS. 3(a) and (b).

Figure 7:
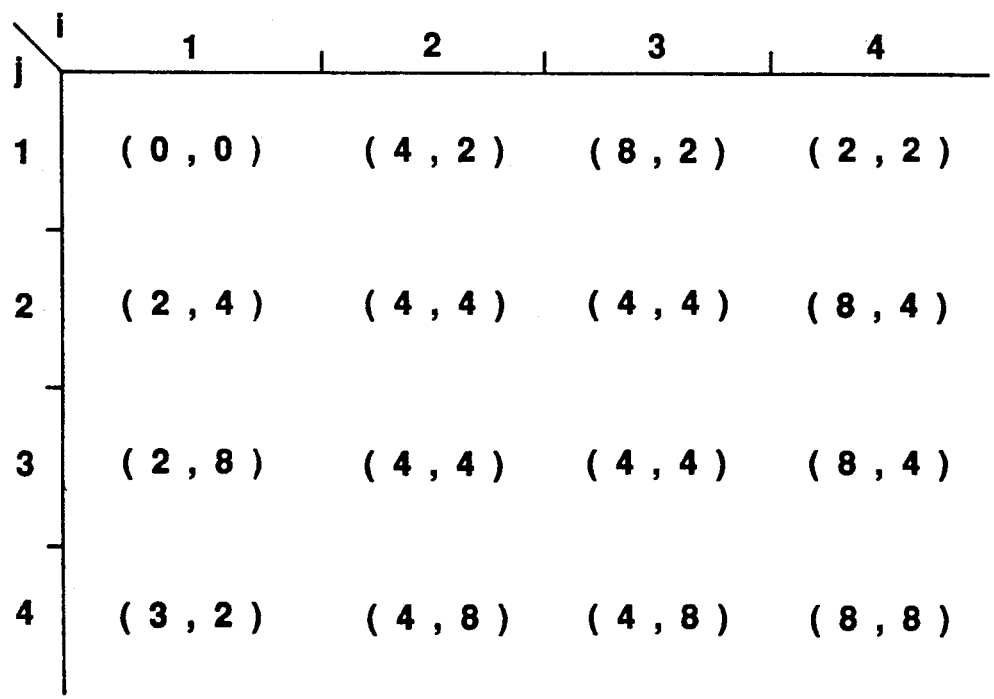

FIG. 7 shows the result of measuring "the frequency of occurrence of the most frequently occurring run lengths of black pixels" in the main scan and subscan directions when pixel block samples are sequentially accessesd in the orders shown in FIGS. 3(a) and (b).

If a pixel block in which "the most frequently occurring run length of black pixels" is equal to, or less than, 2 and in which "the frequency of occurrence of the most frequently occurring run lengths" is 3 or more both in the main scan and subscan directions is determined to be a dot matrix image area, patterns in which these conditions are not met simultaneously are seven patterns in a (i, 1) row and in a (1, j) column in FIG. 2, as in the above example. Of course, these patterns are nothing but ones which are likely to appear in a character/line picture. Thus, it can be very easily determined whether the pixel block is a dot matrix image area.

While in these embodiments the longest run length and frequency of occurrence of black runs or the host frequently occurring run length and the frequency of occurrence of the most frequently occurring run lengths are measured for the "black pixels" and it is determined whether the block is a dot matrix image area on the basis of these results of the measurement, the longest run length and frequency of occurrence of black runs or the most frequently occurring run length and the frequency of occurrence of the most frequently occurring run lengths of "white pixels" or both "black and white pixels" may be measured and it may be determined whether the pixel block is a dot matrix image area on the basis of these results of the measurements.

Figure 8:
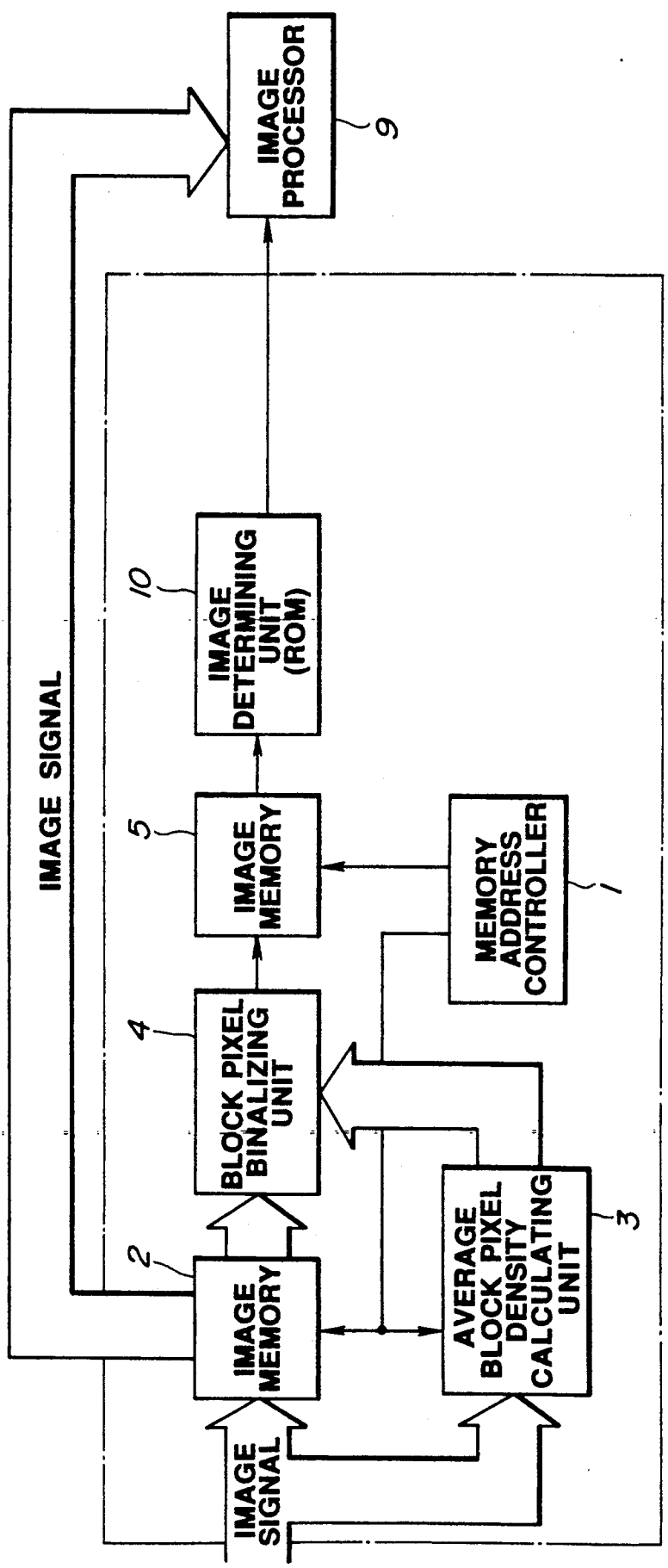
FIGS. 8 and 9 are each a block diagram of another embodiment of the image determining apparatus according to the present invention.

While in the apparatus of FIG. 1 the state of run of black pixels (or white pixels or black and white pixels) of a pixel block, the data on which is stored temporarily in the second image memory 5, in the main scan and subscan directions by the main scan and subscan direction run measuring units 6 and 7 is measured, and the dot matrix image area determining unit 8 determines on the basis of the result of the measurements whether the pixel block is a dot matrix image area, the functions of the main scan and subscan direction measuring units 6 and 7 and the dot matrix image determining unit 8 can be realized as an image determining unit 10 made of a ROM, as shown in FIG. 8. In this case, the image determining unit (ROM) 10 is logically constructed beforehand such that it receives as an address the binarized logical contents (the contents stored temporarily in the second image memory 5) of pixels constituting the pixel block, and outputs to the image processor 9 data on the result of determining whether the pixel block is a dot matrix image or a character/line picture with reference to the length of run and frequency of occurrence of runs as the logical contents. For example, it is empirically known beforehand which image area each of the patterns of pixel blocks such as those shown in FIG. 2 correspond to. Such image determination is possible by recording beforehand in the image determining unit (ROM) 10 data on the result of determining whether the pixel block is a dot matrix image or a character/line picture in a one-to-correspondence to each pattern.

Figure 9:
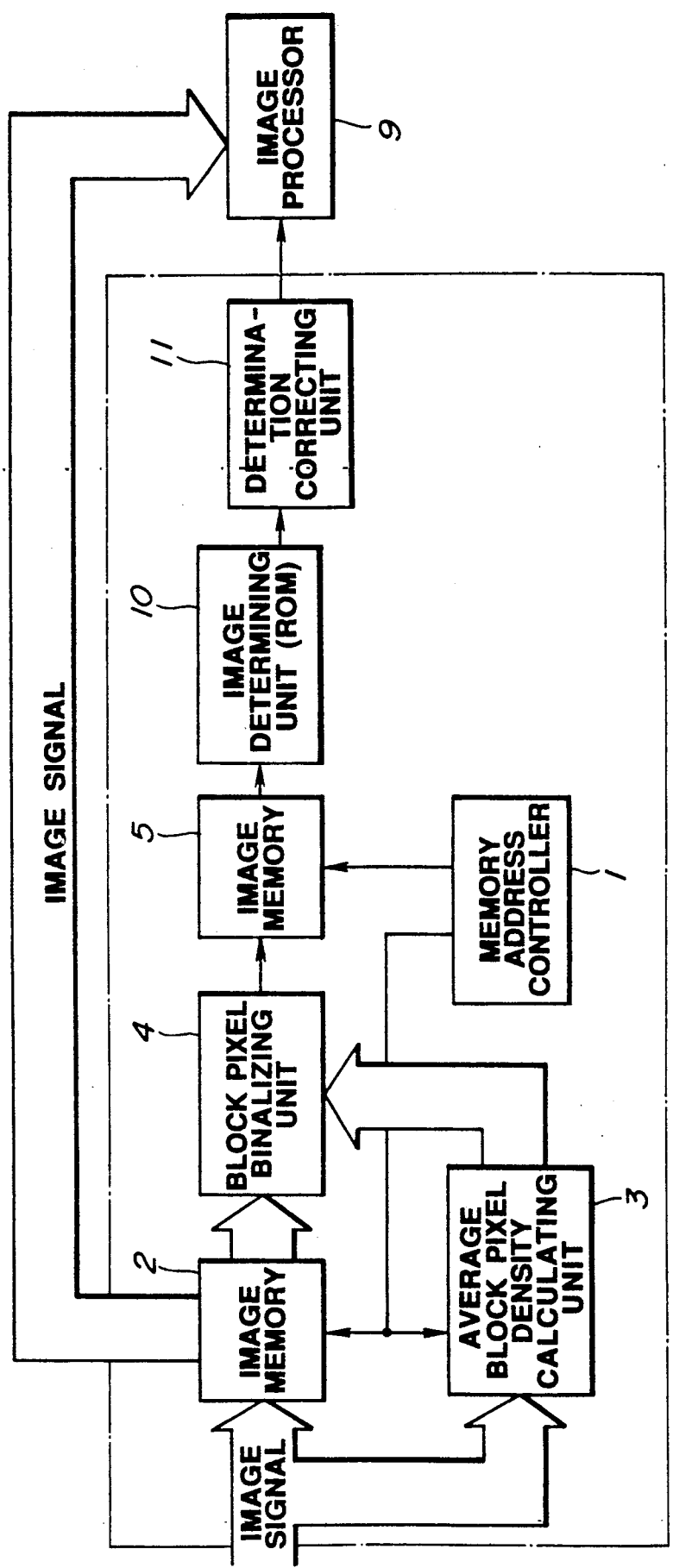

As will be obvious from the previous embodiment in the image determination using the image determining unit (ROM) 10, determination as to pixel blocks corresponding to (1, 1), (1, 4), and (4, 1) in the form of a matrix (i, j) is likely to be unclear, for example, in the pixel block samples of FIG. 2. (In the image determination, for example, about FIGS. 4 and 5 directed to the previous embodiment, these three pixel blocks can be any of a dot matrix image and a character/line picture if image determination is made using only one of the measuring conditions for image determination, shown in FIGS. 4 and 5.) Therefore, it is desirable to additionally provide a determination correcting unit 11 such as that shown in FIG. 9 in practical use. The determination correcting unit 11 corrects the result of the determination by the image determining unit (ROM) 10 about the pixel block by referring to the result of the determination about the pixels of pixel blocks around the particular pixel block (for example, the history of the result of determination by the pixel determining unit (ROM) 10). For example, even if the image determining unit 10 determines that the pixel block, at (1, 4), of the samples of FIG. 2 is a dot matrix image area, data on the result of the determination and corrected to the contents indicative of a character/line picture area by the determination correcting unit 11 is output to the image processor 9 if the pixel blocks around the particular pixel block are determined as being a character/line picture.

What is claimed is:

1. An image determining method of determining a dot matrix image or a character/line picture on the basis of a halftone image signal obtained by scanning an original image including a dot matrix image or a character/line picture, comprising the steps of:
   extracting a pixel block corresponding to a two-dimensional region of a predetermined area from the halftone image signal;
   calculating the average pixel density of the extracted pixel block;
   binarizing the respective pixels of the pixel block using the calculated average pixel density as a density threshold; and
   determining whether the pixel block is a dot matrix image or a character/line picture on the basis of a logical form using as a reference the length of the binarized runs and the frequency of occurrence of the runs.

2. An image determining method according to claim 1, wherein the length of the runs as the reference includes the longest run length of a particular binarized color pixel.

3. An image determining method according to claim 1, wherein the length and frequency of occurrence of runs used as the reference includes the most frequently occurring run length of the particular binarized color pixel and the frequency of occurrence of the most frequenty occurring run length of the particular binarizied color pixel.

4. An image determining apparatus comprising:

means for dividing into a plurality of pixel blocks a halftone image signal obtained by scanning an original document containing a dot matrix image or a character/line picture;
means for calculating the average pixel density of the pixels of each pixel block;
means for binarizing the pixels of the pixel block using the average pixel density as a density threshold;
means for accessing the binarized pixels of each pixel block in a predetermined order;
means for measuring the run length of black pixels of each pixel block and the frequency of occurrence of runs of the black pixels when the pixel block is accessed in the main scan direction and the run length of black pixels of that pixel block and the frequency of occurrence of runs of the black pixels when that pixel block is accessed in the subscan direction; and
means for determining that the pixel block of the image is a dot matrix image area on the basis of the result of the measurement by the measuring means when the run length of the black pixels and frequency of occurrece of runs of the black pixels are in a predetermined relationship.

5. An image determining apparatus according to claim 4, wherein the measuring means measures the longest run length of black pixels of each pixel block and frequency of occurrence of runs of the black pixels when the pixel block is accessed in the main scan direction and the longest run length and frequency of occurrence of runs of the black pixels when the pixel block is accessed in the subscan direction; and
   wherein the determining means determines that the pixel block on the screen is a dot matrix image region on the basis of the result of the measurement by the measuring means when the longest run length and frequency of occurrence of runs of the black pixels are in a predetermined relationship.

6. An image determining apparatus according to claim 4, wherein the measuring means measures the most frequently occurring run length of black pixels of each pixel block and frequency of occurrence of the most frequently occurring run length of the black pixels when the pixel block is accessed in the main scan direction and the most frequently occurring run length of the black pixels and frequency of occurrence of the most frequently occurring run length of the black pixels when the pixel block is accessed in the subscan direction; and
   wherein the determining means determines that the pixel block on the screen is a dot matrix image region on the basis of the result of the determination by the measuring means when the most frequently occurring run length of the black pixels and the frequency of occurrence of the most frequently occurring run length of the black pixels are in a predetermined relationship.

7. An image determining apparatus comprising:
means for dividing into a plurality of pixel blocks a halftone image signal obtained by scanning an original document containing a dot matrix image or a character/line picture;
means for calculating the average pixel density of the pixels of each pixel block;
means for binarizing the pixels of the pixel block using the average pixel density as a density threshold;

means for accessing the binarized pixels of each pixel block in a predetermined order;

means for measuring the run length of white pixels of each pixel block and the frequency of occurrence of runs of the white pixels when the pixel block is accessed in the main scan direction and the run length of white pixels of that pixel block and the frequency of occurrence of runs of the white pixels when that pixel block is accessed in the subscan direction; and means for determining that the pixel block of the image is a dot matrix image area on the basis of the result of the measurement by the measuring means when the run length of the white pixels and frequency of occurrence of runs of the white pixels are in a predetemined relationship.

8. An image determining apparatus according to claim 7, wherein the measuring means measures the longest run length of white pixels of each pixel block and frequency of occurrence of runs of the white pixels when the pixel block is accessed in the main scan direction and the longest run length and frequency of occurrence of runs of the white pixels when the pixel block is accessed in the subscan direction; and wherein the determining means determines that the pixel block of the image is a dot matrix image region on the basis of the result of the measurement by the measuring means when the longest run length and frequency of occurrence of runs of the white pixels are in a predetermined relationship.

9. An image determining apparatus according to claim 7, wherein the measuring means measures the most frequently occurring run length of white pixels of each pixel block and frequency of occurrence of the most frequently occurring run length of the white pixels when the pixel block is accessed in the main scan direction and the most frequently occurring run length of the white pixels and frequency of occurrence of the most frequently occurring run length of the white pixels when the pixel block is accessed in the subscan direction; and wherein the determining means determines that the pixel block on the screen is a dot matrix image region on the basis of the result of the determination by the measuring means when the most frequently occurring run length of the white pixels and the frequency of occurrence of the most frequently occurring run length of the white pixels are in a predetermined relationship.

10. An image determining apparatus comprising:
means for dividing into a plurality of pixel blocks a halftone image signal obtained by scanning an original document containing a dot matrix image or a character/line picture;
means for calculating the average pixel density of the pixels of each pixel block;
means for binarizing the pixels of the pixel block using the average pixel density as a density threshold;
means for accessing the binarized pixels of each pixel block in a predetermined order;
means for measuring the run lengths of black and white pixels of each pixel block and the frequencies of occurrence of runs of the black and white pixels when the pixel block is accessed in the main scan direction and the run lengths of black and white pixels of that pixel block and the frequency of occurrence of runs of the black and white pixels when that pixel block is accessed in the subscan direction; and means for determining that the pixel block of the image is a dot matrix image area on the basis of the result of the measurement by the measuring means when the run lengths of the black and white pixels and frequencies of occurrence of runs of the black and white pixels are in a predetermined relationship.

11. An image determining apparatus according to claim 10, wherein the measuring means measures the longest run lengths of black and white pixels of each pixel block and frequencies of occurrence of runs of the black and white pixels when the pixel block is accessed in the main scan direction and the longest run lengths and frequency of occurrence of runs of the black and white pixels when the pixel block is accessed in the subscan direction; and wherein the determining means determines that the pixel block of the image is a dot matrix image region on the basis of the result of the measurement by the measuring means when the longest run lengths and frequencies of occurrence of runs of the black and white pixels are in a predetermined relationship.

12. An image determining apparatus according to claim 10, wherein the measuring means measures the most frequently occurring run lengths of white pixels of each pixel block and frequencies of occurrence of the most frequently occurring run lengths of the black and white pixels when the pixel block is accessed in the main scan direction and the most frequently occurring run lengths of the black and white pixels and frequencies of occurrence of the most frequently occurring run lengths of the black and white pixels when the pixel block is accessed in the subscan direction; and wherein the determining means determines that the pixel block of the image is a dot matrix image region on the basis of the result of the determination by the measuring means when the most frequently occurring run lengths of the black and white pixels and the frequencies of occurrence of the most frequently occurring run lengths of the black and white pixels are in a predetermined relationship.

13. An image determining apparatus comprising:
means for dividing into a plurality of pixel blocks a halftone image signal obtained by scanning an original document containing a dot matrix image or a character/line picture;
means for calculating the average pixel density of the pixels of each pixel block;
means for binarizing the pixels of the pixel block using the average pixel density as a density threshold; and
a read only memory for receiving as an address the binarized logical contents of the pixels constituting the pixel block and for outputting data on the result of determining whether the pixel block is a dot matrix image or a character/line picture, using as a reference the length of runs and frequency of occurrence of runs of the pixels as the logical contents.

14. An image determining apparatus according to claim 13, including means for correcting the result of determination of the pixel block by the read only memory by referring to the result of determination as to the pixels of other pixel blocks around the pixel block.

* * * * *